United States Patent [19]

Austin

[11] Patent Number: 4,935,962
[45] Date of Patent: Jun. 19, 1990

[54] METHOD AND SYSTEM FOR AUTHENTICATION

[75] Inventor: Jeffrey R. Austin, Hindhead, England

[73] Assignee: NCR Corporation, Dayton, Ohio

[21] Appl. No.: 364,916

[22] Filed: Jun. 12, 1989

Related U.S. Application Data

[63] Continuation-in-part of Ser. No. 331,788, Apr. 3, 1989, abandoned.

[30] Foreign Application Priority Data

May 19, 1988 [GB] United Kingdom ................ 8811816
Mar. 21, 1989 [GB] United Kingdom ................ 8906496

[51] Int. Cl.$^5$ ............................................. H04L 9/30
[52] U.S. Cl. ........................................ 380/25; 380/24;
380/30; 380/50; 340/825.34; 235/379; 235/380; 235/382
[58] Field of Search ................................ 380/23-25,
380/28-30, 49, 50; 340/825.34; 235/379, 380, 382

[56] References Cited

U.S. PATENT DOCUMENTS

| | | | |
|---|---|---|---|
| 4,349,695 | 9/1982 | Morgan et al. | 380/25 |
| 4,351,982 | 9/1982 | Miller et al. | 380/30 |
| 4,405,829 | 9/1983 | Rivest et al. | 380/30 |
| 4,408,203 | 10/1983 | Campbell | 380/24 |
| 4,424,414 | 1/1984 | Hellman et al. | 380/30 |
| 4,471,164 | 9/1984 | Henry | 380/30 |
| 4,549,075 | 10/1985 | Saada et al. | 380/25 |
| 4,679,236 | 7/1987 | Davies | 380/23 |
| 4,723,284 | 2/1988 | Munck et al. | 380/25 |
| 4,748,668 | 5/1988 | Shamir et al. | 380/30 |
| 4,797,920 | 1/1989 | Stein | 380/24 |

OTHER PUBLICATIONS

Rivest et al., "A Method For Obtaining Digital Signatures & Public-Key Cryptosystems"; Communications of the ACM, (2/78; vol. 21, No. 2; pp. 120-126).

17th ACM Symposium on Theory of Computing, May 1985, Goldwasser et al. for "The Knowledge Complexity of Interactive Proof-Systems", pp. 291-304.

ACM Transactions on Computer Systems, vol. 6, No. 4, Nov., 1988, by Okamoto for "A Digital Multisignature Scheme Using Bijective Public-Key Cryptosystems" pp. 432-441.

Computers and Security, vol. 5, No. 3, Sep. 1986, by Pluimakers et al. for "Authentication: A Concise Survey", pp. 243-250.

*Primary Examiner*—Stephen C. Buczinski
*Assistant Examiner*—Bernarr Earl Gregory
*Attorney, Agent, or Firm*—Wilbert Hawk, Jr.; Stephen F. Jewett; Douglas S. Foote

[57] ABSTRACT

An entity such as a smart card includes microprocessor means, input/output means, and PROM storage means which stores a set of transformations $S_i$ ($i=1, \ldots, n$) of a corresponding set of public factors $F_i$ ($i=1, \ldots, n$), where $S_i = F_i^d \pmod{N}$, d being the secret key counterpart of a public key e associated with the modulus N, which is the product of two primes. An authentication device which stores the public factors $F_i$ and the values of N and e, generates an n bit random vector $v = v_i$ which is transmitted to the card where a product Y of the values $S_i$ selected according to the 1 bits of v is computed and transmitted to the authentication device which computes $X_{act} = Y^e \pmod{N}$ and also computes $X_{ref}$, the product of the $F_i$ selected according to the 1 bits of v. If $X_{act}$ and $X_{ref}$ are equal, then the card is authenticated to within a certain probability. An analogous method is disclosed for certifying messages to be transmitted. In further embodiments, a higher degree of security is achieved by arranging for the entity being authenticated, or the certifying entity, to select an additional secret factor or plurality of secret factors.

29 Claims, 3 Drawing Sheets

METHOD AND SYSTEM FOR AUTHENTICATION

CROSS-REFERENCE TO RELATED APPLICATION

This is a continuation-in-part of U.S. application Ser. No. 331,788, filed Apr. 3, 1989, now abandoned.

BACKGROUND OF THE INVENTION

This invention relates to the authentication of entities and messages.

It is a common requirement to verify the authenticity of data which may represent monetary value or may imply the authenticity of the entity generating that data. A typical application where authentication is critical to avoid forgery is found in credit transactions using smart cards. For example, before a credit transaction is undertaken the authenticity of the smart card and/or value dispensed therefrom must be proved to the authentication device (such as data recording or transfer device) involved in the transaction.

To impede forgery only the entity source (for example, the manufacturer of a smart card) should possess the means to produce the authentication elements. This implies that the source must possess some secret. The difficulty in proving authenticity is in providing the means to the authenticator to achieve that proof. Many systems employ an algorithm driven by a secret key such that a data string passed through the algorithm results in a secret transformation of that data. The data so transformed is used as an authentication certificate or code which may be tested by an authenticator. One method of testing involves the authenticator in performing the same secret transformation of the data to yield an authentication certificate which is compared for equality with that provided by the source entity (for example, a smart card).

The problem with this technique is that the authenticator must duplicate the data manipulation by the source entity so as to compare the result for equality. This means that an authenticator can forge an authentication certificate and claim that it emanated from the source entity. Another problem is that the authenticator must also have knowledge of the key. This problem is particularly acute if several authenticators need to authenticate an entity, since each must possess the secret key. Disclosure of this key by one authenticator therefore compromises all authenticators and the source entity. Furthermore, the secret key must be securely distributed to each potential authenticator prior to the event. This therefore limits the ability to authenticate to only those trusted authenticators which were anticipated to require the function.

Where it may be necessary for a large number of unpredictable authenticators to possess the ability to authenticate another entity, the use of secret key algorithms is somewhat impractical. Further, when it is desirable that the authenticator be completely denied the ability to forge an authentication certificate the duplicative equality test method cannot be employed.

Another known technique employs the art of public key cryptography wherein an asymmetrical algorithm is used. Public key cryptography is described in the article: Communications of the ACM, vol. 21, No. 2, February 1978, pages 120-126, R. L. Rivest et al. "A Method for Obtaining Digital Signatures and Public Key Crypto-systems". In this known technique, a data element or a change sensitive compression of a data string is enciphered using a secret key or procedure. Authenticity is proven by obtaining the original data element (or change sensitive compression) which is used as a reference value and then using a public key or procedure to decipher the data supplied by the source entity. Equality of the deciphered data with the reference data implies that the secret key or procedure was employed and thus that the data is authentic.

This technique permits any authenticator to know the public key or procedure with which to prove the authenticity of data emanating from an entity possessing the complementary secret key or procedure. Consequently, the key distribution problem is significantly eased as prior knowledge and secrecy are not required.

However, the publicly known procedure must not permit the secret key or procedure to be easily determined. Generally, the algorithms possessing this property require substantial computing power to perform the secret procedure. This usually renders them unsuitable for low cost entities where operational speed is a requirement. If multiple portable entities or the data emanating from them must be able to be tested for authenticity, then the secret key and algorithm must be contained in each entity. In this case, disclosure of the secret key in one entity will compromise all similar entities.

This technique is therefore not practical for low cost replicated entities.

European Patent Application No. 0 252 499 discloses a method for creating a unique card identifier in the form of a "smart card" which involves selecting a modulus which is a product of two primes, preparing a string of information unique to the card identifier, utilizing a pseudorandom function to transform such string and a plurality of selected indices to derive an associated plurality of values which are quadratic residues with respect to the modulus, computing the square roots of the reciprocals of the quadratic residues, and recording the information string, such square roots and the related indices in the card identifier. Such card is authenticated by transmitting the information string and the selected indices from the card to a verification device and generating in the verification device the quadratic residues utilizing the pseudorandom function, selecting in the card a random number, computing the squared value of the random number and transmitting such squared value from the card to the verification device, generating in the verification device a random vector which is sent to the card, computing in the card the product of the random number and a selection of the stored square root values dependent on the random vector, transmitting the product to the verification device, squaring the transmitted product and multiplying such squared value by a selection of the computed quadratic residue values selected in accordance with the random vector, and checking that the result value is equal to the squared random number. This known method is complex and in particular involves the selection and utilization of quadratic residue values.

OBJECTS OF THE INVENTION

It is an object of the present invention to provide a new and improved method and system for the authentication of entities and messages.

It is another object of the present invention to provide a secure system and method for authenticating entities and messages contained therein which require relatively simple computations by the entity.

SUMMARY OF THE INVENTION

Therefore, according to one form of the present invention, there is provided a method for preparing an entity to be authenticated by an authentication device including:

- selecting a modulus N which is a product of at least two prime numbers;
- selecting an integer e which is relatively prime to $\Phi(N)$, where $\Phi(N)$ is Euler's totient function of N;
- determining an integer d such that $e \cdot d = 1 \pmod{\Phi(N)}$;
- selecting a set of n public factors $F_1, \ldots, F_n$ ($0 < F_i < N$);
- calculating $S_i = F_i^d \pmod{N}$ for $i = 1, \ldots, n$; and
- storing the n values $S_i$ ($i = 1, \ldots, n$) and the value N in the entity.

According to another form of the present invention, there is provided a method of authenticating an entity by an authentication device. The steps include those described above for preparing the entity and further include:

- placing the entity in communication with an authentication device;
- generating in the authentication device an n bit binary string $v = v_i$ ($i = 1, \ldots, n$)
- transmitting the binary string v to the entity;
- calculating, in the entity $$Y = \pi_{v_i = 1} S_i \pmod{N};$$

- transmitting Y to the authentication device;
- calculating in the authentication device:

$$X_{ref} = \pi_{v_i = 1} F_i \pmod{N}; \text{ and}$$

$$X_{act} = Y^e \pmod{N}; \text{ and}$$

comparing $X_{ref}$ and $X_{act}$.

According to another form of the present invention there is provided a method of certifying a message M generated by or presented to an entity. The steps include those described for the first form of the present invention, preparing the entity, and further include:

- computing a change sensitive transformation H of the message M;
- generating an n bit binary string $v = v_i$ ($i = 1, \ldots, n$), using the computed value of H;
- computing $Y =$ $$Y = \pi_{v_i = 1} S_i \pmod{N};$$

and
- appending Y as a message authentication code certificate to the message M.

According to yet another form of the present invention, there is provided an authentication system, including an entity which comprises processing means, input/output means and memory means. The memory means has stored therein a modulus N which is the product of at least two prime numbers, and a set of n factors $S_i$ ($i = 1, \ldots, n$) where $S_i = F_i^d \pmod{N}$, wherein d is the secret key counterpart of a public key e associated with the modulus N, and $F_i$ ($i = 1, \ldots, n$) are n public factors, $0 < F_i < N$. The processing means is adapted to compute $$Y = \pi_{v_i = 1} S_i \pmod{N}$$

where $v = v_i$ is an n bit binary string.

According to a still another form of the present invention, the authentication system further includes further processing means, further input/output means and further memory means. The further memory means has stored therein the n public factors $F_i$ ($i = 1, \ldots, n$), the modulus N, and the public key e. The further processing means is adapted to compute $$X_{ref} = \pi_{v_i = 1} F_i \pmod{N};$$

and $X_{act} = Y^e \pmod{N}$ using the stored values of Fi, N and e, and to compare $X_{ref}$ with $X_{act}$.

DETAIL DESCRIPTION OF THE INVENTION

Firstly, the theoretical basis underlying the invention will be explained, as an aid to understanding the invention. It is known that, if N is the product of (at least) two prime numbers P, Q, i.e., if $$N = P \cdot Q,$$

and if e is relatively prime to $\Phi(N)$, where $$\Phi(N) = (P - 1) \cdot (Q - 1)$$

is Euler's totient function (the number of integers less than N which are relatively prime to N), then, in modulus N arithmetic, a value d can be determined (see for example, the aforementioned article by Rivest et al) which is the multiplicative inverse of e such that $$e \cdot d = 1 \pmod{\Phi(N)}$$

The value d is commonly referred to as the secret key counterpart of the public key e.

Thus, if $$X = Y^e \pmod{N},$$

then $$Y = X^d \pmod{N}$$

for all values of Y, $0 < Y < N$.

Furthermore, if $$X = F_1 \cdot F_2 \cdot \ldots \cdot F_n \pmod{N} \qquad (1)$$

where $F_i$ (i=1, ..., n) are integer values, with $0 < F_i < N$
then $$X^d = F_1^d \cdot F_2^d \cdot \ldots \cdot F_n^d \pmod{N}$$

and $$X^d \pmod{N} = \{F_1^d \pmod{N} \cdot F_2^d \pmod{N} \cdot \ldots \cdot F_n^d \pmod{N}\} \pmod{N}$$

Let $$S_i = F_i^d \pmod{N}; \quad i=1, \ldots, n \tag{2}$$

Then $$X^d \pmod{N} = S_1 \cdot S_2 \cdot \ldots \cdot S_n \pmod{N}$$

Let $$Y = X^d \pmod{N}$$

Therefore $$Y = S_1 \cdot S_2 \cdot \ldots \cdot S_n \pmod{N} \tag{3}$$

Let v represent a binary string of n bits, $v = v_1 \ldots v_n$ such that each bit $v_i$ of v is a flag indicating the inclusion of the corresponding $F_1, \ldots, F_n$ and $S_1, \ldots, S_n$ in the calculation of X and Y respectively, so that $$X = \pi_{v_i=1} F_i \pmod{N}. \tag{4}$$

(4)
From (3)

$$Y = \pi_{v_i=1} S_i \pmod{N} \tag{5}$$

(5)
Therefore, provided that the N and d values employed in (1) and (2) satisfy the above requirements, then $$X = \pi_{v_i=1} F_i \pmod{N} = \left( \pi_{v_i=1} S_i \pmod{N} \right)^e \pmod{N} =$$

$$Y^e \pmod{N}$$

for all values of $F_i$, $0 < F_i < N$.

With the above in mind, a first embodiment of the invention will now be described, wherein multiple low cost entities, which will be referred to in the descriptions of the preferred embodiments as smart cards, are prepared by a card issuer and distributed to individuals. The embodiment enables such issued cards to be expeditiously authenticated by verifying devices.

Figure 1:
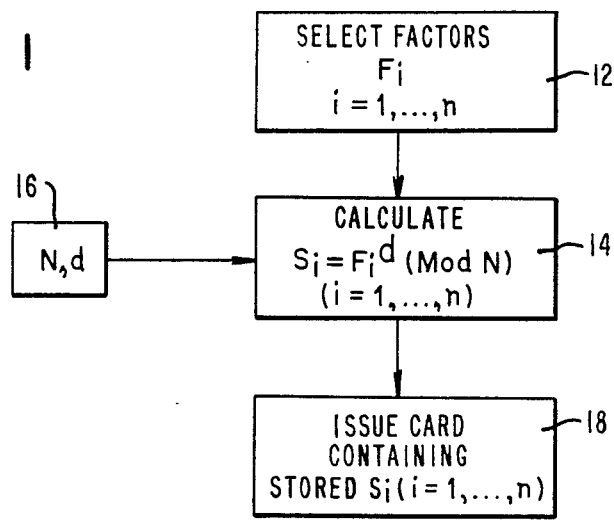
FIG. 1 is a block diagram showing the procedure utilized by a card issuer in creating a smart card.

Referring first to FIG. 1, a card issuer selects, as shown at box 12, a plurality of n public factors $F_i$ (i=1, ..., n), where $0 < F_i < N$, and such factors, together with the value of the modulus N and the value of e are made publicly available to authenticators, that is, organizations which may wish to authenticate smart cards issued by the smart card issuer. In a particular application a suitable value for n is 32, and the value of N is in the range $2^{512} < N < 2^{513}$.

The card issuer computes the n values $S^i$, where $$S_i = F_i^d \pmod{N} \quad i=1, \ldots, n$$

as shown at box 14, using provided values of N and d (box 16), where d is maintained secret. These values $S_i$ are also maintained secret. The card issuer then issues cards which contain n values $S_i$ (i=1, ..., n) stored in a secure manner, for instance in a secure PROM. It should be understood that by a "secure PROM" herein is meant a PROM the contents of which are protected from unauthorized read-out, for example, such protection may involve software protection and hardware protection in the form of shielding.

Figure 2:
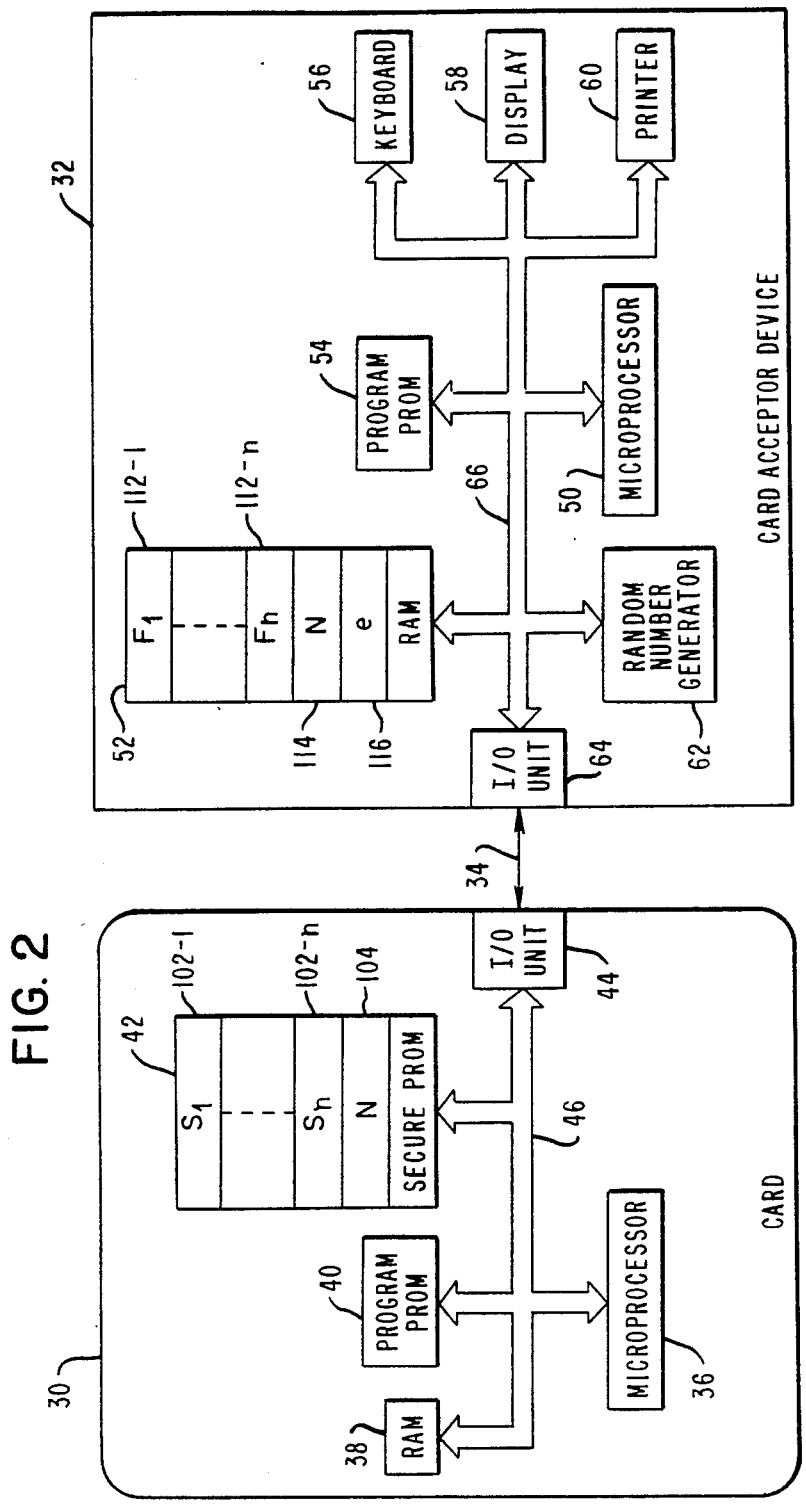
FIG. 2 is a block diagram of a card in operative association with a card acceptor device.

When it is desired to authenticate a smart card 30, FIG. 2, the card 30 is inserted into a card acceptor device 32, whereby a data communication path 34 is established between the smart card 30 and the card acceptor device 32.

The smart card 30 includes a microprocessor 36, a RAM 38, a program PROM 40 which stores the program controlling the operation of the card 30, a secure PROM 42 containing the n values $S_i$ (i=1, ..., n) stored in respective storage locations 102-1 to 102-n and the value N stored in a storage location 104, and an input-/output unit 44. Alternatively, since N is a public value, it could be stored in the RAM 38. The elements 36, 38, 40, 42 and 44 within the card are interconnected by a communications bus 46.

The card acceptor device 32 includes a microprocessor 50, a RAM 52, a program PROM 54 which stores the program controlling the operation of the acceptor device 32, a keyboard 56, a display 58, a printer 60, a random number generator 62, and an input/output unit 64. The RAM 52 includes storage locations 112-1 to 112-n storing the n public factors $F_1, \ldots, F_n$ and storage locations 114, 116 storing the values N and e, respectively. The various units located in the card acceptor device 32 are interconnected by a communications bus 66.

When a card 30 inserted into the card acceptor device 32 is to be checked for authenticity, the random number generator 62 generates an n bit random number v having n bits $v_i$(i=1, ..., n). In order to ensure that v contains at least two bits equal to binary 1, the microprocessor 50 is controlled, if necessary, to set the least significant bits of v progressively to binary 1 until at least two binary 1 bits are present in v. Thus, if the initial value of v is all zero bits, then the two least significant bits are set to binary 1. The value v is stored in the RAM 52.

The value v is then transmitted from the RAM 52 via the input/output unit 64 over the communication path 34 and the input/output unit 44 and is stored in the RAM 38 contained in the card 30. The microprocessor 36 checks that v contains at least two binary 1 bits, and if so, computes the value Y where $$Y = \pi_{v_i=1} S_i \pmod{N}$$

using the values $S_i$ stored in the PROM 42.

The value Y is then transmitted via the input/output unit 44, the transmission path 34 and the input/output unit 64 and is stored in the RAM 52. Using the values $F_i$(i=1, ..., n) v, and e, stored in the RAM 52, the microprocessor 50 then computes $$X_{ref} = \underset{v_i=1}{\pi} F_i \pmod{N}$$

and $$X_{act} = Y^e \pmod{N},$$

and tests whether $$X_{ref} = X_{act}.$$

Equality implies the authenticity of the $X_{act}$ response with probability of 1:N. The authenticity of the card 30 producing the response has a probability of $1:2^n-n$. By issuing repetitive random challenges in the form of random values of v, the probability that the card 30 is authentic increases exponentially by $1:(2^n-n)^j$ where j is the number of challenges issued.

It will be appreciated that the card 30 needs only to compute $$Y = \underset{v_i=1}{\pi} S_i \pmod{N}$$

to respond to a challenge. Since this is at most n−1 multiplications using modulo N arithmetic, the work factor is significantly less than $Y = X_{ref}^d \pmod{N}$ for any large value of d. In this connection, it will be appreciated that since d is in effect the secret key associated with the card 30, and given that $$e \cdot d = 1 \pmod{\Phi(N)}$$

then d will be in the order of magnitude of 2N/3 for convenient values of e. Thus, in the described embodiment, authentication security comparable to that achievable with public key digital signature methods is achieved with significantly less computational effort. Furthermore, with no secret key used during the authentication process, it is possible to produce multiple cards 30 loaded with the $S_l, \ldots, S_n$ values which may be dynamically challenged by a verifying device to achieve similar confidence levels to those obtained with public key digital signature authentication methods.

It will be appreciated that the result of the authentication procedure can be indicated on the display 58 and/or recorded by the printer 60.

Figure 3:
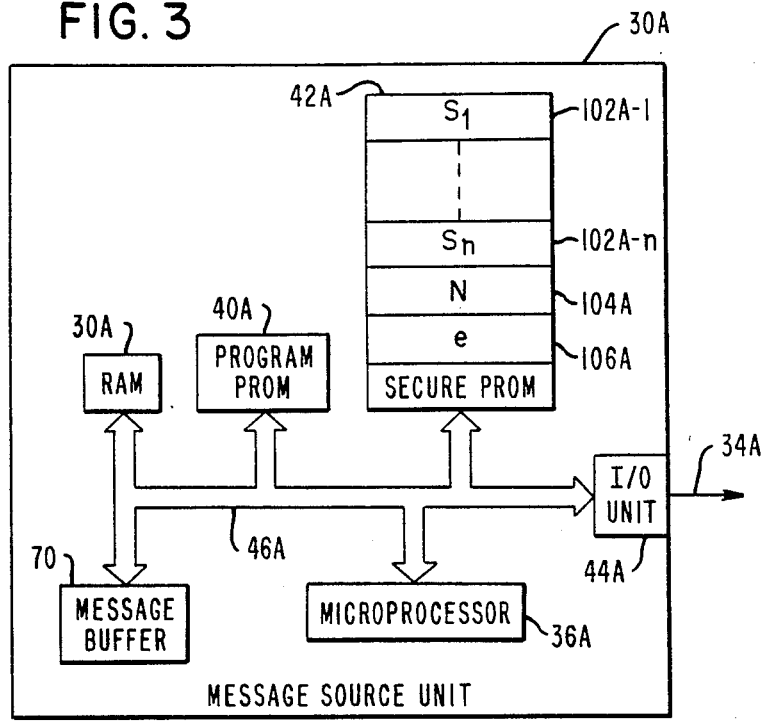
FIG. 3 is a block diagram of a message source unit.

In a second embodiment of the invention, a data string forming a message M is authenticated by appending a certificate thereto. Such message M could, for example, be a data string representing a legal document, a program file, or other information. Referring to FIG. 3, there is shown a message source unit 30A, which includes a message buffer 70 adapted to temporarily store a message M to be authenticated. The message source unit 30A further includes a microprocessor 36A, a RAM 38A, a program PROM 40A, a secure PROM 42A and an input/output unit 44A connected to a communications path 34A. The message source unit 30A also includes a communications bus 46A interconnecting elements 36A, 38A, 40A, 42A, 44A and 70 therein. It will be appreciated that the elements having the references with suffix A in FIG. 3 correspond to similarly referenced elements in the smart card 30 shown in FIG. 2, and in a practical implementation, the message source unit 30A could be a smart card. Furthermore, the secure PROM 42A stores the values $S_l, S_2, \ldots S_n$ in locations 102A-1 to 102A-n, the value of the modulus N in storage location 104A and the value of e in storage location 106A. Clearly, the values of N and e, being public values, could alternatively be stored in the RAM 38a.

A message M stored in the message buffer 70 is authenticated by appending thereto a message authentication code (MAC) which is computed in the following manner.

Using the stored values of N and e, the microprocessor 36A first computes a change sensitive transformation H of the message M. In the preferred embodiment, this is effected by computing $$H = M^e \pmod{N}$$

The value H is then converted to a binary value J, which is segmented into subfields of length n (with padding of an incomplete field with predetermined binary bits if necessary) and the individual subfields are added together modulo 2 (Exclusive OR operation) such that the resultant binary string is used as $v = v_i$ $(i=1, \ldots, n)$ in the calculation of Y, where $$Y = \underset{v_i=1}{\pi} S_i \pmod{N},$$

as described in the first embodiment.

This value of Y is then appended as a message authentication code (MAC) when the message M is transmitted from the message source unit 30A via the input/output unit 44A to a communication path 34A.

Figure 4:
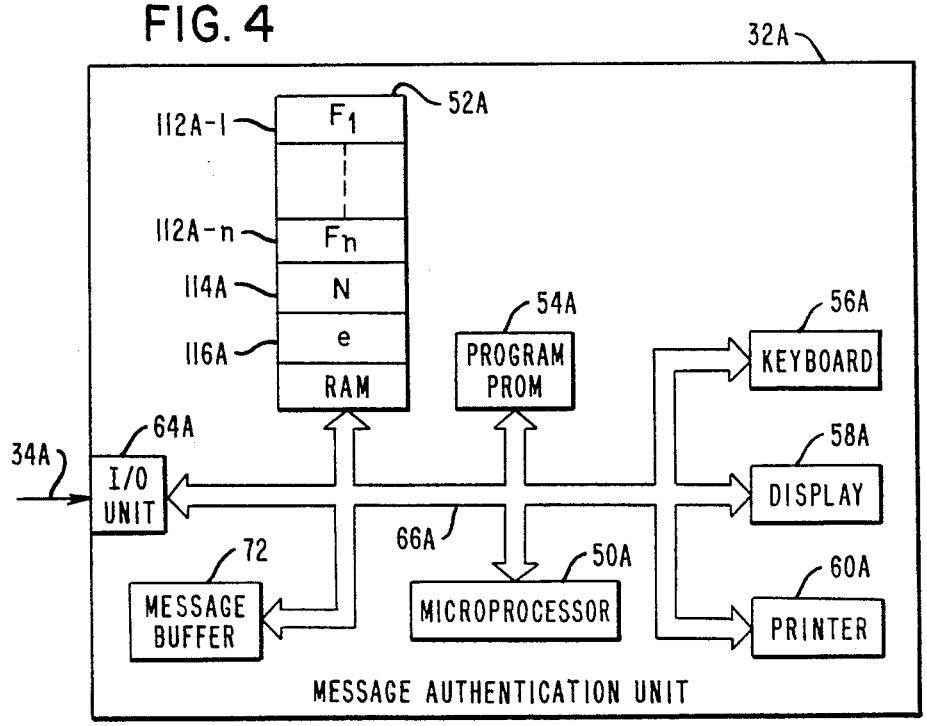
FIG. 4 is a block diagram of a message authentication unit.

An authentication device 32A, FIG. 4, which is of generally similar construction to the card acceptor device 32 shown in FIG. 2 may be used to authenticate the transmitted message M. The authentication device 32A includes a message buffer 72, a RAM 52A, a program PROM 54A, a keyboard 56A, a display 58A, a printer 60A, an input/output unit 64A and an interconnecting communications bus 66A.

Stored in the RAM 52A, in locations 112A-1 to 112A-n, 114A and 116A, are the public factor values $F_1, \ldots, F_n$, together with the public key e and modulus N.

The message M, received over the communications path 34A is stored in the message buffer 72, together with the MAC, Y.

Using the received message M, the microprocessor 50A computes H and J to obtain v as in the message source unit 30A, and then computes $$X_{ref} = \underset{v_i=1}{\pi} F_i \pmod{N}$$

utilizing the public factors $F_i$ stored in the RAM 52A.

Using the received value Y stored in the message buffer 70, the microprocessor 50A then computes $$X_{act} = Y^e \pmod{N}.$$

Finally, the values of $X_{act}$ and $X_{ref}$ are compared using the microprocessor 50A. Equality of $X_{act}$ and $X_{ref}$ implies that the message source unit 30A possessed $S_1, \ldots, S_n$, and thus that the message M is authentic, within a probability of 1:N. It will be appreciated that this embodiment has the advantage that a low cost entity (message source unit 30A) may readily certify data emanating from it with a probability of 1:N.

It should be understood that in the second embodiment, as in the first embodiment, in order to protect the $S_i$ values from disclosure, it must be ensured that v contains at least two binary 1 bits, by progressively setting the least significant bits of v to binary 1 if necessary.

The second embodiment of the invention has the further advantage that several message source units 30A or the data emanating therefrom may be authenticated without the unit actually being present at the time of authentication. This ability is particularly useful for authenticating messages which may have been produced some time earlier by various message source units 30A, in the form of low cost entities such as smart cards. Multiple message source units may share the same $F_1, \ldots, F_n$ values which would be standardized for the scheme, with individual integrity being ensured by various values of e and N.

However, it is preferred to standardize e and $F_1, \ldots, F_n$ for all users of an authentication scheme within a group of users and for the operator of each message source unit to publish a specific value N to be used for his message source unit. Should an operator possess several such units, rather than specifying a unique value of N for each unit, integrity can be assured in a manner which will now be described with reference to the third embodiment of the invention.

According to a third embodiment of the invention, a message M may be authenticated as originating from a unique message source unit among a set of such message source units sharing the same $F_1, \ldots, F_n$ and N and e values. This has the advantage that it is infeasible for one member of such a set to masquerade as another member of the set. For this purpose, the operator of the system allocates to each message source unit a public factor $F_{ID}$ which is unique to that source unit. Furthermore, the operator of the system computes, for each such $F_{ID}$ value, a corresponding $S_{ID}$ value;

$$S_{ID} = F_{ID}^d \pmod{N},$$

where d is the system secret key, and stores $S_{ID}$ in the secure memory of the relevant message source unit.

Figure 5:
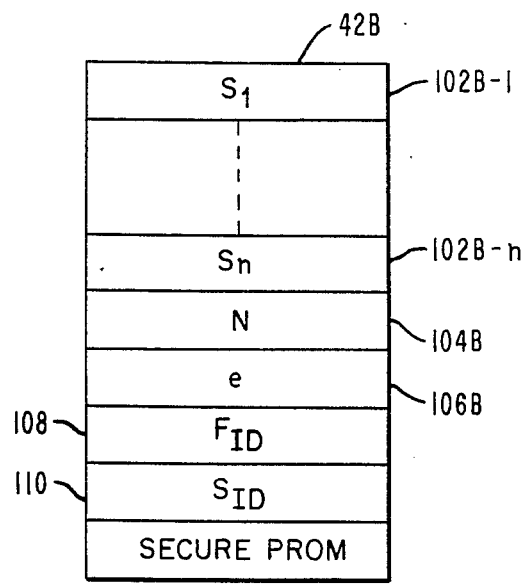
FIG. 5 is a diagram showing the map of a memory utilized in an alternative embodiment of the invention.

Referring to FIG. 5, there is shown a diagram of the secure PROM 42B included in the message source unit. The PROM 42B contains storage locations 102B-1 to 102B-n storing the n values $S_1, \ldots, S_n$, respectively, storage locations 104B and 106B storing the values N, e, respectively, and storage locations 108, 110, storing the values $F_{ID}$, $S_{ID}$, respectively.

In the third embodiment, it should be understood that the operation is generally similar to that described for the second embodiment, except that the calculation of the MAC, Y, is made according to the formula $$Y = S_{ID} \cdot \pi_{v_i=1} S_i \pmod{N},$$

using the stored $S_{ID}$ and $S_i$ values. Correspondingly, the calculation of $X_{ref}$ in the message authentication unit is made according to the formula $$X_{ref} = F_{ID} \cdot \pi_{v_i=1} F_i \pmod{N},$$

using the stored $F_i$ values, with the $F_{ID}$ value being included in the certified message transmitted from the message source unit to the message authentication unit for use in the computation of $X_{ref}$.

It will be appreciated that in the third embodiment, with $S_{ID}$ included in the computation of Y, the requirement that v contains at least two binary 1 bits is reduced to the requirement that v should be nonzero.

The embodiments described hereinabove may be used for any application where it is desired to authenticate entities or the data emanating from them. An important application, however, is to an intelligent financial transaction token such as a smart card used in Electronic Funds Transfer at the Point of Service (EFTPOS). For several reasons of cost and security it is perceived that the so called "smart card" provides a highly effective technology for EFTPOS.

A fundamental reason for using smart card technology is to enable a transaction to be completed fully off-line from the card issuer's authorization system with a minimum of risk to the various parties affected.

From a risk analysis point of view, the following areas must be considered (a) Is the card holder legitimate?
(b) Is the card authentic?
(c) Is the implied value loaded into or dispensed by the card authentic?
(d) Is the transaction claim made by the card acceptor authentic?

Card holder authenticity is generally effected by employing a Personal Identification Number (PIN) which is verified by or with the smart card prior to sensitive operations being initiated. Such PIN may be entered via a keyboard such as the keyboard 56, FIG. 2, or by a keyboard (not shown) integral with the card.

It is commonly perceived that card authenticity needs to be established prior to transferring value to prevent bogus funds being loaded into or dispensed by the card. However, this requirement in essence occurs with many implementations because it is not possible to authenticate at the point of service the value data exchanged.

Therefore, considering the dispersal of value from a card, provided that the card could itself produce an authentication certificate for the data emanating from it such that the certificate could be tested by any other device, then card authentication is unnecessary. This has significant consequence for remote card authentication or home banking applications, as the need for a trusted card authentication device at the point of card acceptance is eliminated. This possibility also enables any intermediate device handling the value message between the card and the agency guaranteeing the funds to test the authenticity of the data in order to undertake settlement actions. In this sense, the potential exists for true electronic currency.

Considering the loading of value, if it can be shown that data emanating from a card is authentic, it must be assumed that only an authentic card could perform the certificate calculation correctly. Therefore, if only an authentic card can correctly dispense funds, then the requirement of preventing the loading of bogus value can be readily met by designing authentic cards such that they will reject an attempted loading of bogus value themselves.

Since the card contains the ability to generate certificates, it could therefore check a certificate as well. This could be done in a fourth embodiment of the invention by calculating a certificate for value load data presented to the card in the same manner as done by the card itself and appending that certificate to the value load data. The card could replicate that operation and compare the result with the presented certificate. The presumption is that only the agency guaranteeing dispensed value could correctly load value so that it is assumed that this agency knows the secret certificate calculation method.

However, this technique would require the agency generating the load value certificate to have available a record of each card's secrets (given the potential size of card networks, the possibility that several value generators may wish to load value, and the highly desirable need to uniquely authenticate each card) this requirement could become impractical.

The primary advantage of the embodiments described hereinabove is that any entity may easily test the authenticity of data emanating from another source. If it was considered that the source of the value load data was a similar entity to the load accepting entity, then any other entity including the destination card itself could similarly easily test the load data for authenticity prior to acceptance.

Thus, the need to authenticate a card or, conversely, the need for the card to authenticate the load source is eliminated if the techniques of public message authentication as described in the third embodiment are employed.

Thus, the fourth embodiment of the invention provides a means and method for eliminating the need for trusted terminal devices, which may have the capability of adding information or value to the entities in the set, by delivering such information with an authentication certificate such that the member entity can authenticate that information as emanating from the identified source prior to its acceptance. In the fourth embodiment the member entity (smart card) possesses both the ability to generate its own certificates and also test certificates from other entities by employing in the first case the techniques of the third embodiment to generate certificates and in the second case the complementary techniques of the third embodiment to test certificates.

In this fourth embodiment, the card may additionally contain stored therein the $F_iF_i$, N and e values appropriate for each value load generator which is authorized by the card issuer to perform the value load function. For convenience, all generators should employ the same public factors $F_i$ and public key e, with individual integrity being obtained by the use of different N values.

Although in the preferred embodiments, the calculations within the card 30, and acceptor device 32, message source unit 30A and message authentication unit 32A have been described as being effected by microprocessors 36, 50, 36A, 50A, it should be understood that in a modification, each microprocessor may be associated with a respective dedicated calculation unit which performs the function $$f(P) = P \cdot M \pmod{N}.$$

Such dedicated circuitry may use shift register and serial adder/subtracter elements such that a value M is multiplied by a value P while simultaneously the value N is subtracted, if necessary, to yield within a single computation cycle the desired product value P·M (mod N). By this means, the function $$Y = \pi_{v_i=1} S_i \pmod{N}$$

may be computed with the values $S_i$ being progressively presented as indicated by the values of the bits $v_i$ of v.

The embodiments described above provide a high degree of security both for the authentication of entities and for the certification of messages. However, it should be understood that, depending on system implementation, a sophisticated attacker could compromise a system employing such authentication and/or certification techniques, as will now be explained. Thus, since the factors $F_i$ and $S_i$ are selected for multiplication according to the value of V, it follows that, if the system design permitted an appropriately manipulated authentication device to generate any desired values of V, for example, if the values $$V_a = 3 \text{ (decimal)} = 011 \text{ (binary)}$$

and $V_b = 7$ (decimal) $= 111$ (binary)
could be freely chosen, then corresponding Y values $$Y_a = S_1 \cdot S_2 \pmod{N}$$

and $Y_b = S_1 \cdot S_2 \cdot S_3 \pmod{N}$
would be produced.
Since $$S_3 = Y_b/Y_a = (S_1 \cdot S_2 \cdot S_3)/(S_1 \cdot S_2 \pmod{N}),$$

$S_3$ is disclosed. Similarly, any desired $S_i$ can be ascertained, provided that division operations can be effected. Due to the modulus N operation on $Y_a$ and $Y_b$, simple division will not necessarily yield a correct value. However, since N is a composite of large prime numbers (usually two), then most numbers in the range to $N-1$ will have a modulo N reciprocal, i.e. given Y, there is, generally, a value $Y^{-1}$, such that $$Y \cdot Y^{-1} = 1 \pmod{N}$$

Known mathematical techniques can be utilized to find such reciprocal value $Y^{-1}$.

Hence, $S_3 = Y_b \cdot Y_a^{-1} \pmod{N}$ can be determined, and, by similar techniques, the remaining $S_i$ can also generally be ascertained. Having ascertained the $S_i$ values, the sophisticated attacker, using suitable hardware could fraudulently effect authentication and certification procedures.

To avoid such an attack, it should be made infeasible to select V values which yield a set of Y values which can be manipulated to yield single factors $S_i$.

In a fifth embodiment of the invention, this problem is alleviated by including an additional public parity factor $F_p$ and associated secret factor $S_p$ in the system, where $$S_p = F_p^d \pmod{N},$$

and arranging that all Y values are the product of an even number of factors, utilizing $S_p$ if necessary, thus preventing the ascertainment of any single factor. For example, with this arrangement, for V=1 (decimal), Y=$S_1 \cdot S_p$ (mod N)
for V=2 (decimal), Y=$S_2 \cdot S_p$ (mod N)
for V=3 (decimal), Y=$S_1 \cdot S_2$ (mod N), etc.

Thus, in the arrangement described with reference to FIG. 1, a card issuer selects an additional public factor $F_p$, calculate $S_p$ and store $S_p$ in the cards to be issued. Similarly, in the message certification system described with reference to FIGS. 3 and 4, the additional secret parity factor $S_p$ is stored in the PROM 42A and the corresponding public parity factor $F_p$ stored in the RAM 52A. Again, with the unique identification arrangement described with reference to FIG. 5, the secret parity factor $S_p$ is stored in the secure PROM 42B, in addition to the $S_{ID}$ value, and with this arrangement, there is the further advantage that V can be in the full range of 0 to $2^n - 1$. This is desirable for message certification since it eliminates any need to adjust the message hash result. Thus, with this arrangement, for V=0 (decimal), Y=$S_{ID} \cdot S_p$ (mod N)

for V=1 (decimal), Y=$S_{ID} \cdot S_1$ (mod N)

for V=2 (decimal), Y=$S_{ID} \cdot S_2$ (mod N)

for V=3 (decimal), Y=$S_{ID} \cdot S_1 \cdot S_2 \cdot S_p$ (mod N), etc. Although it could be argued that if the fifth embodiment is utilized, an attacker could selectively extract all factor pairs, e.g. $S_2 \cdot S_2 = V_3 \cdot V_0^{-1}$, and use these pairs to produce bogus certificates in a message certification scheme, such an attack may be infeasible due to the number of pairs needed to be obtained and fraudulently used in systems where n has a suitably large value.

Another way to prevent selective extraction of $S_i$ values by an attacker is to ensure that any Y value is not consistently related to any other Y value. This can be achieved by including a variable component in the Y calculation which cannot be controlled or predicted by an attacker. Such variable component should be chosen from a large enough set of possible component values to make the reoccurrence of any specific value statistically improbable. That is, the number of Y values needing to be obtained to ensure that the same variable component is included in the calculation, should be infeasibly large for an attacker.

Firstly, it will be appreciated that the Y values are in fact a base set of $2^n$ values pseudo randomly distributed within the set bounded by 1 and N−1. Secondly, it will be appreciated that the numerical separation of these Y values is in fact precisely determined. Application of an offset value which was applied to all Y values in the base set would in effect produce another set of precisely separated Y values within the set 1, N−1. Thus, provided that the number of Y sets which could be produced by offset was large enough to be statistically unique, then mathematical extraction of the factors making up a certain Y value would be infeasible, unless the set offset value was known, since the number of valid Y values within the set 1, N−1 would be increased from $2^n$ to $2^n$ times the number of Y sets.

In the extreme case, consider that the number of Y sets was N−1 then the number of valid Y values would be $2^n \cdot (N-1)$. This would raise the probability that an entity producing a Y value was authentic, or that a message from the entity was authentic, from $2^n$ to $2^n \cdot (N-1)$. For typical N values $2^{512} < N < 2^{513}$ then the order of probability of authenticity would be $2^n 2^{512}$. This is not true in practice since the total of Y values available is N−1, limiting the probability to 1:(N−1). Clearly since this order of probability far exceeds any reasonable requirement, the number of Y sets could be substantially reduced. If $2^s$ equals the number of binary bits available to denote the set number then the number of sets would be $2^s$ giving an authenticity probability of $2^n \cdot 2^s$ or $2^{n+s}$. Note that in principle n and s could be varied in size to obtain the order of probable authenticity protection desired in the system. However, since the $2^n$ component may be selectable via V by an attacker the $2^s$ component should be large enough to make such an attack infeasible. Also, note that n determines the range of V and should be large enough to preclude undetected manipulation of message contents when V results from a hash function of a message.

In such a system it is necessary to communicate to the authenticator the Y set employed for a particular Y calculation by the certifying entity. If this was directly disclosed as an offset value, then the aforementioned attacks could still be executed since reversing the offset process would yield the original base set of Y values and thus by extraction, the base set of $S_i$ values. Consequently, the offset value or set identifier should be provided in a manner usable by the authenticator for Y testing but not for Y factoring.

For example, it is possible to include in the authentication protocol a value $F_{set}$ which is passed to the authenticator for each Y calculation. $F_{set}$ is produced by the certifier selecting a set number $S_{set}$ and computing $F_{set} = S_{set}^e$ (mod N)

Note that $S_{set}$ cannot be determined from $F_{set}$ without knowledge of d. Thus, for entity authentication, the entity:

(i) Selects an $S_{set}$
(ii) Computes $F_{set} = S_{set}^e$ (mod N)
(iii) Communicates $F_{set}$ to the authentication device, which
(iv) Selects a V value and communicates this value to the entity, which computes
(v)

$$Y = S_{set} \cdot \prod_{V_i=1} S_i$$

(mod N) which it communicates to the authentication device, which tests Y by
(vi)

$$X_{ref} = F_{set} \cdot \prod_{V_i=1} F_i$$

(mod N)=$X_{act}$=$Y^e$ (mod N).

Note that, since $F_{set}$ is a pseudo random distribution within the set 1, N−1 from which it is not feasible to determine $S_{set}$, then it is not necessary to choose $S_{set}$ randomly. The protection from analytical attacks can be obtained merely by ensuring that $S_{set}$ does not predictably repeat within an attack session. One such method to achieve this is to run an incremental count of Y calculations and to use this count value to update $S_{set}$. This method has the further advantage of providing to the entity originator a method of cryptographically checking for lost or duplicated messages delivered to him from the source entity.

Thus, in a sixth embodiment of the invention, for message certification, $$Y = S_{ID} \cdot S_{set} \cdot \underset{V_i=1}{\pi} S_i \cdot S_p \; (\bmod \; N)$$

where $S_{set}$ = a function of the counter value $S_{ID} = F_{ID}{}^d \; (\bmod \; N)$ $S_i = F_i{}^d \; (\bmod \; N)$ $S_p = F_p{}^d \; (\bmod \; N)$ optionally included if V has even parity, and the certificate Y is calculated across a message including $F_{ID}$, $F_{set}$ therein, where $F_{set} = S_{set}{}^e \; (\bmod \; N)$.

To generate the $S_{set}$ counter values a hardware counter could be provided in a smart card or entity to be authenticated, such as the card 30, FIG. 2, or in a message source unit such as the message source unit 30A, FIG. 3. Alternatively, the microprocessor 36 or 36A therein could be programmed to provide a counting operation using storage locations in the RAM memories 38 or 38A. An analogous arrangement could be utilized when a unique identifier factor $S_{ID}$ and associated $F_{ID}$ are employed as described hereinabove with reference to the third embodiment of the invention.

In the just mentioned system the protocol is enlarged by the inclusion of $F_{set}$. This is unimportant for interactive entity authentication by locally communicating devices but may be an unacceptable overhead for message certification.

A further method of pseudo randomly varying the base set of Y values which does not add significantly to the protocol is to utilize precalculated offset values the selection of which is advised to the authentication device.

In a seventh embodiment of the invention, V, which is made up of n bits, is split into two parts, $V_s$ and $V_a$, where $V_s$ is chosen by the certifier, and $V_a$ as before is chosen in the authentication device (or determined by the message content). The number of bits in each of $V_s$ and $V_a$ is predetermined. For example, where n=32, each of $V_s$ and $V_a$ could have 16 bits. The bits of $V_s$ are used to select the $S_{set}$ offset value with the bits of $V_a$ being used to select the $S_a$ values. Note also that the $S_{set}$ offset values can be combined to yield $2^{ns}$ offset values, where ns is the number of base offset values available.

Thus, in the seventh embodiment, $$Y = \underset{V_{si}=1}{\pi} S_{si} \cdot \underset{V_{ai}=1}{\pi} S_{ai} \; (\bmod \; N);$$

$$X_{ref} = \underset{V_{si}=1}{\pi} F_{si} \cdot \underset{V_{ai}=1}{\pi} F_{ai} \; (\bmod \; N); \text{ and}$$

$X_{act} = Y^e \; (\bmod \; N)$, as before.

The values $S_{si} = F_{si}{}^d \; (\bmod \; N)$ are stored by the certifier (smart card or message source unit) and used in a similar manner to the $S_{ai}$ values, but selected by the certifier pseudo randomly.

The values $F_{si}$ are made publicly available in the same manner as the $F_{ai}$ values.

In this embodiment, $V_s$ rather than $F_{set}$ would be included (and hashed for $V_a$) in the certified message.

Thus, for message certification where the unique identifier factors $S_{ID}$ and $F_{ID}$ are utilized, $M = V_s$, $F_{ID}$, Message.

As in the second embodiment, a change sensitive transformation H of the aggregate message M is formed, and the value of $V_a$ derived therefrom. The following calculations are then effected:

$$Y = S_{ID} \cdot \underset{V_{si}=1}{\pi} S_{si} \cdot \underset{V_{ai}=1}{\pi} S_{ai} \; (\bmod \; N); \text{ and}$$

$$X_{ref} = F_{ID} \cdot \underset{V_{si}=1}{\pi} F_s \cdot \underset{V_{ai}=1}{\pi} F_{ai} \; (\bmod \; N).$$

It can be seen from the above that the authenticity of a particular Y value is as before 1:N. The authenticity of the entity producing the Y value (entity forgery) is determined by the number of bits in $V_s$ and $V_a$ and is therefore $1:2^{ns+na}$.

It will be clear to those skilled in the art that the present invention is not limited to the specific embodiments disclosed and illustrated herein. Nor is it limited in application to smart cards. Numerous modifications, variations, and full and partial equivalents can be undertaken without departing from the invention as limited only by the spirit and scope of the appended claims.

What is desired to be secured by Letters Patent of the United States is as follows.

What is claimed is:

1. A method for preparing an entity to be authenticated by an authenticating device including:
    selecting a modulus N which is a product of two or more prime numbers;
    selecting an integer e which is relatively prime to $\Phi(N)$, where $\Phi(N)$ is Euler's totient function of N;
    determining an integer d such that $e \cdot d = 1 \; (\bmod \; \Phi(N))$;
    selecting a set of n public factors $F_1, \ldots, F_n$, $0 < F_i < N$;
    calculating $S_i = F_i{}^d \; (\bmod \; N)$ for $i = 1, \ldots, n$; and
    storing the n values $S_i$, $i = 1, \ldots, n$, and the value N in said entity.

2. A method according to claim 1 wherein said entity includes a PROM, said method further comprising:
    storing said n values $S_i$ in said PROM.

3. A method according to claim 2 further comprising:
    providing said entity with processing means and input/output means.

4. A method according to claim 1 further comprising:
    assigning a public factor $F_{ID}$ unique to said entity;
    computing $S_{ID} = F_{ID}{}^d \; (\bmod \; N)$; and
    storing the value $S_{ID}$ in said entity.

5. A method of authenticating an entity by an authentication device comprising:
(a) selecting a modulus N which is a product of two or more prime numbers;
(b) selecting an integer e which is relatively prime to $\Phi(N)$, where $\Phi(N)$ is Euler's totient function of N;
(c) determining an integer d such that $e \cdot d = 1 \pmod{\Phi(N)}$;
(d) selecting a set of n public factors $F_1, \ldots, F_n$, $0 < F_i < N$;
(e) calculating $S_i = F_i^d \pmod{N}$ for $i = 1, \ldots, n$;
(f) storing the n values $S_i$, $i = 1, \ldots, n$), and the value N in said entity;
(g) placing said entity in communication with said authentication device;
(h) generating in said authentication device an n bit binary string $v = v_i$ ($i = 1, \ldots, n$);
(i) transmitting said binary string v to said entity;
(h) calculating in said entity $$Y = \underset{v_i = 1}{\pi} S_i \pmod{N};$$

(k) transmitting Y to said authentication device;
(l) calculating in said authentication device: $X_{ref}$ $$X_{ref} = \underset{v_i = 1}{\pi} F_i \pmod{N};$$

and $$X_{act} = Y^e \pmod{N}; \text{ and}$$

(m) comparing $X_{ref}$ and $X_{act}$.

6. A method according to claim 5, wherein in said step (j) the value of Y is calculated utilizing selectively an additional predetermined factor $S_p$, such that the total number of factors included in the calculation of Y is even, and wherein in said step (l), the value of $X_{ref}$ is correspondingly calculated. utilizing selectively an additional factor $F_p$, where $S_p = F_p^d$.

7. A method according to claim 5 further comprising:
storing said said public factors $F_1, \ldots, F_n$, and the values of N and e in said authentication device.

8. A method according to claim 7 further comprising:
repeating said steps (h) to (m) a plurality of times, using random values of v.

9. A method of certifying a message M by an entity comprising:
selecting a modulus N which is a product of two or more prime numbers;
selecting an integer e which is relatively prime to $\Phi(N)$, where $\Phi(N)$ is Euler's totient function of N;
determining an integer d such that $e \cdot d = 1 \pmod{\Phi(N)}$;
selecting a set of n public factors $F_1, \ldots, F_n$, $0 < F_i < N$;
calculating $S_i = F_i^d \pmod{N}$ for $i = 1, \ldots, n$;
storing the n values $S_i$, $i = 1, \ldots, n$, and the value N in said entity
computing a change sensitive transformation H of said message M;
generating an n bit binary string $v = v_i$, $i = 1, \ldots, n$, using the computed value of H;
computing $$Y = \underset{v_i = 1}{\pi} S_i \pmod{N};$$

and
appending Y as a message authentication code certificate to said message M.

10. A method according to claim 9 wherein said step of generating an n bit binary string v includes:
converting H to a binary value J;
segmenting J into subfields of length n; and
adding together the individual subfields modulo 2 to for said n bit binary string v.

11. A method according to claim 9 wherein said step of computing a change sensitive transformation H includes:

computing $H = M^e \pmod{N}$.

12. A method according to claim 11 wherein said step of generating an n bit binary string v includes:
converting H to a binary value J;
segmenting J into subfields of length n; and
adding together the individual subfields modulo 2 to form said n bit binary string v.

13. A method of authenticating an entity by an authentication device comprising:
(a) selecting a modulus N which is a product of two or more prime numbers;
(b) selecting an integer e which is relatively prime to $\Phi(N)$, where $\Phi(N)$ is Euler's totient function of N;
(c) determining an integer d such that $e \cdot d = 1 \pmod{\Phi(N)}$;
(d) selecting a set of n public factors $F_1, \ldots, F_n$, $0 < F_i < N$;
(e) calculating $S_i = F_i^d \pmod{N}$ for $i = 1, \ldots, n$;
(f) storing the n values $S_i$, $i = 1, \ldots, n$, and the value N in said entity;
(g) placing said entity in communication with said authentication device;
(h) generating in said authentication device an n bit binary string $v = v_i$, $i = 1, \ldots, n$;
(i) transmitting said binary string v to said entity;
(j) selecting a value $S_{set}$ in said entity and computing in said entity $F_{set} = S_{set}^e$;
(k) calculating in said entity $$Y = S_{set} \cdot \underset{v_i = 1}{\pi} S_i \pmod{N};$$

(l) transmitting Y and $F_{set}$ to said authentication device;
(m) calculating in said authentication device:

$$X_{ref} = F_{set} \cdot \underset{v_i = 1}{\pi} F_i \pmod{N};$$

and $$X_{act} = Y^e \pmod{N}; \text{ and}$$

(n) comparing $X_{ref}$ and $X_{act}$.

14. A method according to claim 13 wherein $S_{set}$ is selected in accordance with a count value which is incremented for each Y calculation.

15. A method according to claim 14 wherein $S_{set}$ is determined by selecting a set $S_{si}$ of said factors $S_i$, said selection being in accordance with a binary string $V_s = v_{si}$ generated in said entity, and wherein Y is calculated according to the formula:

$$Y = \pi_{v_{si}=1} S_{si} \cdot \pi_{v_{ai}=1} S_{ai} \pmod{N},$$

where the $v_{ai}$ values correspond to the bits of said n-bit binary string generated in said authentication device;
wherein step (1) further comprises transmitting $V_s$ to said authentication device; and
wherein, in step (m), the value of $X_{ref}$ is calculated according to the formula:

$$X_{ref} = \pi_{v_{si}=1} F_{si} \cdot \pi_{v_{ai}=1} F_{ai} \pmod{N}.$$

16. A system, including an entity for generating an output Y in response to an input v, said entity comprising:
memory means having stored therein a modulus N which is the product of at least two prime numbers, and a set of n factors $S_i$, $i=1,\ldots,n$, where $S_i = F_i^d$ (mod N), wherein d is the secret key counterpart of a public key e associated with the modulus N, and $F_i$, $i=1,\ldots,n$, are n public factors, $0 < F_i < N$;
processing means adapted to compute $$Y = \pi_{v_i=1} S_i \pmod{N},$$

where $v = v_i$ is an n bit binary string; and
input/output means.

17. A system according to claim 16, wherein the value of Y includes an additional factor $S_{set}$ which is dependent on a count value which is incremented for each Y calculation.

18. A system according to claim 17, wherein said memory means has stored therein an additional parity factor $S_p$, and wherein said processing means is adapted to compute the value of Y by selectively including said additional parity factor $S_p$ in the expression for Y, such that the total members of factors included in the calculation of Y is even.

19. A system according to claim 16 wherein:
said memory means has stored therein the value of said public key e; and
said processing means is further adapted (a) to compute $H = M^e$ (mod N), where M is a message to be transmitted by said entity;
(b) to convert H to a binary n bit vector v; and
(c) to compute $$Y = \pi_{v_i=1} S_i \pmod{N}$$

using the bits $v_i$ of the computed vector v; and said input/output means is adapted to transmit Y as a message authentication code associated with said message.

20. A system according to claim 19, further including an authentication device which comprises:
further input/output means;
further memory means having stored therein said n public factors $F_i (i=1,\ldots,n)$, said modulus N, and said public key e; and
further processing means adapted to compute $$X_{ref} = \pi_{v_i=1} F_i \pmod{N};$$

(mod N); and $X_{act} = Y^3$ (mod N) using the stored values of $F_i$, N and e, and to compare $X_{ref}$ with $X_{act}$.

21. A system according to claim 16, wherein said memory means has stored therein a public factor $F_{ID}$ unique to said entity, and a value $S_{ID}$, where $S_{ID} = F_{ID}^d$ (mod N).

22. A system according to claim 21, further including an authentication device which comprises:
further input/output means;
further memory means having stored therein said n public factors $F_i 1, \ldots, n$, said modulus N, and said public key e; and
further processing means adapted to compute $$X_{ref} = \pi_{v_i=1} F_i \pmod{N};$$

and $X_{act} = Y^e$ (mod N) using the stored values of $F_i$, N and e, and to compare $X_{ref}$ with $X_{act}$.

23. A system according to claim 22 wherein said further processing means is further adapted to compute $$X_{ref} = F_{ID} \cdot \pi_{v_i=1} F_i \pmod{N}.$$

24. A system according to claim 16, further including an authentication device which comprises:
further input/output means;
further memory means having stored therein said n public factors $F_i$, $i=1,\ldots,n$, said modulus N, and said public key e; and
further processing means adapted to compute $$X_{ref} = \pi_{v_i=1} F_i \pmod{N};$$

and $X_{act} = Y^e$ (mod N) using the stored values of $F_i$, N and e, and to compare $X_{ref}$ with $X_{act}$.

25. An entity comprising:
memory means having stored therein
(a) a modulus N which is the product of at least two prime numbers,
(b) a set of n factors $S_i$, $i=1,\ldots,n$, where $S_i = F_i^d$ (mod N), wherein d is the secret key counterpart of a public key e associated with the modulus N, and $F_i$, $i=1,\ldots,n$, are n public factors $0 < F_i < N$,
(c) said n public factors $F_i$, $i=1,\ldots,n$,
(d) said modulus N, and
(e) said public key e;
processing means adapted to compute Y $$Y = \prod_{v_i=1} S_i \pmod{N},$$

where $v = v_i$ is an n bit binary string and further adapted to compute $$X_{ref} = \prod_{v_i=1} F_i \pmod{N};$$

and $X_{act} = Y^e \pmod{N}$ using the stored values of $F_i$, $N$ and $e$, and to compare $X_{ref}$ with $X_{act}$; and input/output means.

26. An entity according to claim 25 wherein:

said memory means has stored therein the value of said public key e;

said processing means is further adapted (a) to compute $H = M^e \pmod{N}$, where M is a message to be transmitted by said entity;

(b) to convert H to a binary n bit vector v; and (c) to compute $$Y = \prod_{v_i=1} S_i \pmod{N}$$

using the bits $v_i$ of the computed vector v; and said input/output means is adapted to transmit Y as a message authentication code associated with said message.

27. An entity according to claim 26, wherein said memory means has stored therein a public factor $F_{ID}$ unique to said entity, and a value $S_{ID}$, where $S_{ID} = F_{ID}^d \pmod{N}$.

28. An entity according to claim 27 wherein said processing means is further adapted to compute $$Y = S_{ID} \cdot \prod_{v_i=1} S_i \pmod{N}.$$

29. An entity according to claim 28 wherein said processing means is further adapted to compute $$X_{ref} = F_{ID} \cdot \prod_{v_i=1} F_i \pmod{N}.$$

* * * * *

UNITED STATES PATENT AND TRADEMARK OFFICE
CERTIFICATE OF CORRECTION

PATENT NO. : 4,935,962

DATED : June 19, 1990

INVENTOR(S) : Jeffrey R. Austin

It is certified that error appears in the above-identified patent and that said Letters Patent is hereby corrected as shown below:

Column 20, line 16, in the formula "$X_{act}=Y^3$" delete "$3$" and substitute --$e$--.

Column 20, line 26, delete "$F_i 1$" and substitute --$F_i$, i=1--.

Column 20, line 61, delete "$F_i$" and substitute --$F_i d$--.

Signed and Sealed this

Twenty-ninth Day of October, 1991

Attest:

HARRY F. MANBECK, JR.

*Attesting Officer*  *Commissioner of Patents and Trademarks*